United States Patent
Chen et al.

(10) Patent No.: US 11,496,067 B2
(45) Date of Patent: Nov. 8, 2022

(54) POWER CONVERSION APPARATUS WITH DUAL-MODE CONTROL

(71) Applicant: DELTA ELECTRONICS, INC., Taoyuan (TW)

(72) Inventors: Sin-Hong Chen, Taoyuan (TW); Xin-Hung Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/384,342

(22) Filed: Jul. 23, 2021

(65) Prior Publication Data
US 2022/0038028 A1    Feb. 3, 2022

(30) Foreign Application Priority Data
Jul. 31, 2020 (TW) .................................. 109125959

(51) Int. Cl.
*H02M 7/5387* (2007.01)

(52) U.S. Cl.
CPC ................................ *H02M 7/5387* (2013.01)

(58) Field of Classification Search
CPC .......... H02J 3/38; H02J 3/381; H02M 7/5387; H02M 7/53871; H02M 7/53873
USPC .............................. 307/11; 363/123, 131, 132
See application file for complete search history.

(56) References Cited

U.S. PATENT DOCUMENTS

| | | | | |
|---|---|---|---|---|
| 7,440,300 B2* | 10/2008 | Konishi | .................... | H02J 3/38 323/266 |
| 2012/0002454 A1* | 1/2012 | Kuboyama | ............... | H02J 3/44 363/132 |
| 2015/0029772 A1* | 1/2015 | Shimada | .................. | H02M 7/48 363/132 |
| 2015/0207433 A1* | 7/2015 | Liu | ..................... | H02M 7/5387 363/132 |
| 2017/0093332 A1* | 3/2017 | Lee | ......................... | H02S 40/32 |

FOREIGN PATENT DOCUMENTS

| | | |
|---|---|---|
| CN | 107863785 A | 3/2018 |
| CN | 111030174 A | 4/2020 |

OTHER PUBLICATIONS

Office Action dated May 7, 2021 of the corresponding Taiwan patent application No. 109125959.

* cited by examiner

*Primary Examiner* — William Hernandez
(74) *Attorney, Agent, or Firm* — Chun-Ming Shih; HDLS IPR Services

(57) ABSTRACT

A power conversion apparatus with dual-mode control includes a bridge arm assembly, a capacitor assembly, and control unit. The bridge arm assembly includes a first bridge arm and a second bridge arm. The control unit selectively controls the first bridge arm to be operated in a voltage source switching mode or a current source switching mode according to the load type of a first load, and controls the second bridge arm to be operated in the voltage source switching mode or the current source switching mode according to the load type of a second load.

15 Claims, 9 Drawing Sheets

US 11,496,067 B2

POWER CONVERSION APPARATUS WITH DUAL-MODE CONTROL

BACKGROUND

Technical Field

The present disclosure relates to a power conversion apparatus with dual-mode control, and more particularly to a power conversion apparatus that can switch operation modes according to load types.

Description of Related Art

The statements in this section merely provide background information related to the present disclosure and do not necessarily constitute prior art.

In today's grid-connected renewable energy systems, most of them use solar energy as the main source of power, which is usually combined with backup power (for example, but not limited to, rechargeable batteries). When solar power is sufficient, the solar power is provided to supply power to the load or feed back to the power grid. When solar power is insufficient, the solar power and backup power are used together to supply power to the load. Since the electricity generated by solar energy must be converted in order to produce a suitable AC power for supplying loads or feeding back to the power grid, an inverter is necessary.

When the traditional inverter is applied, however, the inverter can only operate in a single mode, which is either a current source mode or a voltage source mode. In the voltage source mode, there is only one kind of output voltage. Therefore, the load is limited by the single operation mode of the traditional inverter, and it cannot be used for flexible applications. Due to the existence of split-phase systems in some countries (for example, but not limited to, Japan), the application of traditional inverter is even more limited and can only be used in certain special circumstances.

SUMMARY

In order to solve the above-mentioned problems, a power conversion apparatus with dual-mode control is provided. The power conversion apparatus includes a bridge arm assembly, a capacitor assembly, and a control unit. The bridge arm assembly includes a first bridge arm and a second bridge arm. The first bridge arm has a first upper bridge switch and a first lower bridge switch; a node between the first upper bridge switch and the first lower bridge switch is coupled to a first load end. The second bridge arm connected to the first bridge arm in parallel has a second upper bridge switch and a second lower bridge switch; a node between the second upper bridge switch and the second lower bridge switch is coupled to a second load end. The capacitor assembly has a first capacitor and a second capacitor connected in series, and is connected to the second bridge arm in parallel, and a node between the first capacitor and the second capacitor is coupled to a middle end. The control unit selectively controls the first bridge arm to be operated in a voltage source switching mode or a current source switching mode according to the load type of a first load coupled to the first load end and the middle end, and selectively controls the second bridge arm to be operated in the voltage source switching mode or the current source switching mode according to the load type of a second load coupled to the second load end and the middle end.

Since the power conversion apparatus is a circuit structure of a dual half-bridge conversion apparatus, and it can selectively operate one of the bridge arms in the voltage source switching mode and the other bridge arm in the current source switching mode according to the load type, regardless of the load type, it can be operated by the control unit, thereby increasing the flexibility of the load configuration of the power conversion apparatus.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
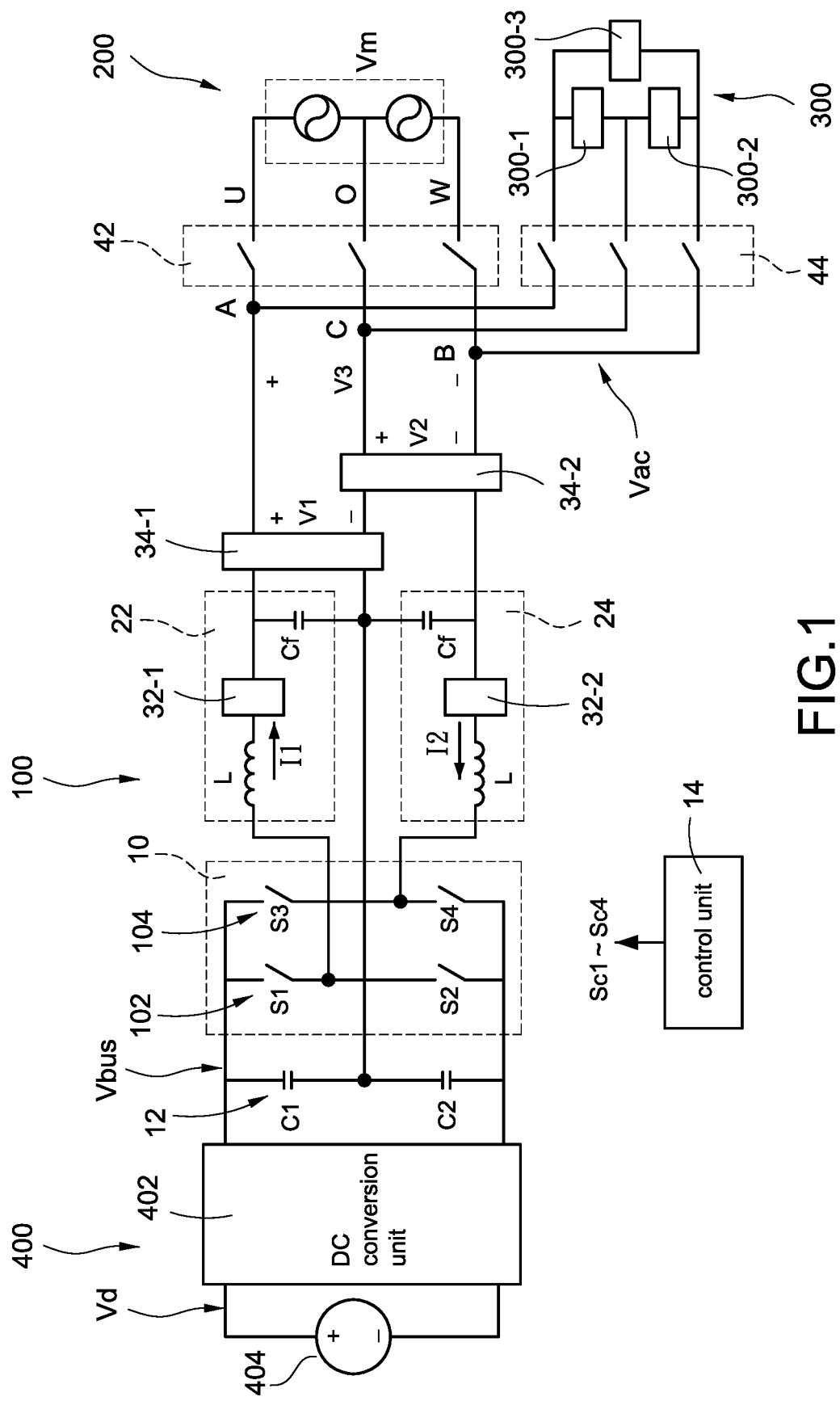
FIG. 1 is a block circuit diagram of a power conversion apparatus with dual-mode control according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a power conversion apparatus with dual-mode control according to the present disclosure. The power conversion apparatus 100 is coupled to a power grid 200 and a load assembly 300. The control modes of the power conversion apparatus 100 can be adjusted according to actual demands of the power grid 200 and the load assembly 300. Specifically, the power conversion apparatus 100 includes a DC conversion module 400. In the grid connection, a mains Vm provided by the power grid 200 supplies power to the load assembly 300. A bus voltage Vbus provided by the DC conversion module 400 can be converted by the power conversion apparatus 100 into an AC output matching the mains Vm to supply power to the power grid 200, or into an AC voltage Vac to supply power to the load assembly 300. The operation of the grid connection or the stand alone can be changed by using relays. The load assembly 300 may include a load that receives power and a load that provides power (for example but not limited to, a photovoltaic inverter, which is a circuit structure of solar cells and inverters). When the load assembly 300 has a load that can provide power, the AC voltage Vac provided by the load assembly 300 can be converted into the bus voltage Vbus through the power conversion apparatus 100 to supply power to the DC conversion module 400.

The power conversion apparatus 100 includes a bridge arm assembly 10, a capacitor assembly 12, and a control unit 14. The bridge arm assembly 10 is connected to the capacitor assembly 12 in parallel, the bridge arm assembly 10 is coupled to the power grid 200 and the load assembly 300, and the capacitor assembly 12 is coupled to the DC conversion module 400. The control unit 14 is coupled to the bridge arm assembly 10. When one of the loads is a load that can provide power (a power-supplying load), the control unit 14 switches the bridge arm assembly 10 to control the power conversion apparatus 100 to convert the power provided from the power-supplying load to a load that receives power (a power-receiving load). An inverter is composed of the bridge arm assembly 10, which includes a first bridge arm 102 and a second bridge arm 104, and the first bridge arm 102 is connected to the second bridge arm 104 in parallel. The first bridge arm 102 includes a first upper bridge switch S1 and a first lower bridge switch S2. The first upper bridge switch S1 is connected to the first lower bridge switch S2 in series, and a node between the first upper bridge switch S1 and the first lower bridge switch S2 is coupled to a first load end A. The second bridge arm 104 includes a second upper bridge switch S3 and a second lower bridge switch S4. The second upper bridge switch S3 is connected to the second lower bridge switch S4 in series, and a node between the second upper bridge switch S3 and the second lower bridge switch S4 is coupled to a second load end B.

The capacitor assembly 12 includes a first capacitor C1 and a second capacitor C2 connected to the first capacitor C1 in series. A node between the first capacitor C1 and the second capacitor C2 is coupled to a middle end C. The load assembly 300 includes at least one load, which is a load that receives power or a load that provides power. The load, namely a first load 300-1 may be coupled between the first load end A and the middle end C, or the load, namely a second load 300-2 may be coupled between the second load end B and the middle end C, or the load, namely a third load 300-3 may be coupled between the first load end A and the second load end B. For the general household load application, the voltage (in root-mean-square) of supplying the third load 300-3 is substantially twice the voltage of supplying the first load 300-1 (or the second load 300-2). For example, if the voltage of supplying the first load 300-1 is controlled at 110 volts and the voltage of supplying the second load 300-2 is also controlled at 110 volts, the voltage of supplying the third load 300-3 can be acquired at 220 volts.

The control unit 14 is coupled to the first upper bridge switch S1, the first lower bridge switch S2, the second upper bridge switch S3, and the second lower bridge switch S4, and provides control signals Sc1-Sc4 to control the first upper bridge switch S1, the first lower bridge switch S2, the second upper bridge switch S3, and the second lower bridge switch S4, respectively. Specifically, the control unit 14 provides the control signals Sc1-Sc2 according to load types of the first load 300-1 to selectively control the first upper bridge switch S1 and the first lower bridge switch S2 to operate in a voltage source switching mode or a current source switching mode. The control unit 14 provides the control signals Sc3-Sc4 according to load types of the second load 300-2 to selectively control the second upper bridge switch S3 and the second lower bridge switch S4 to operate in the voltage source switching mode or the current source switching mode.

When the control unit 14 controls the first bridge arm 102 to operate in the voltage source switching mode, the control unit 14 controls duty cycles of the control signals Sc1-Sc2 to control the first bridge arm 102 so as to stabilize a voltage across the first load 300-1. When the control unit 14 controls the second bridge arm 104 to operate in the voltage source switching mode, the control unit 14 controls duty cycles of the control signals Sc3-Sc4 to control the second bridge arm 104 so as to stabilize a voltage across the second load 300-2. When the control unit 14 controls the first bridge arm 102 to operate in the current source switching mode, the control unit 14 controls duty cycles of the control signals Sc1-Sc2 to control the first bridge arm 102 so as to control the power provided from the first load 300-1. When the control unit 14 controls the second bridge arm 104 to operate in the current source switching mode, the control unit 14 controls duty cycles of the control signals Sc3-Sc4 to control the second bridge arm 104 so as to control the power provided from the second load 300-2. In one embodiment, the power conversion apparatus 100 is a dual half bridge conversion apparatus, and therefore the first bridge arm 102 is used to control the first load 300-1 and the second bridge arm 104 is used to control the second load 300-2. Since the power conversion apparatus 100 is a dual half-bridge conversion apparatus, one bridge arm can be operated in the voltage source switching mode and the other bridge arm can be operated in the current source switching mode. Therefore, regardless of the type of load (for example but not limited to, the first load 300-1 is a power-receiving household load, and the second load 300-2 is a power-supplying PV (photovoltaic) inverter), it can be controlled by the control unit 14 to operate, thereby increasing the load configuration flexibility of the power conversion apparatus 100.

The power grid 200 may be a single-phase grid or split-phase grid. When the power grid 200 is the single-phase grid, a live wire of the power grid 200 is coupled to the first load end A and a neutral wire thereof is coupled to the second load end B. When the power grid 200 is the split-phase grid, a U end of the power grid 200 is coupled to the first load end A, a W end thereof is coupled to the second load end B, and a middle end O is coupled to the middle end C. The DC conversion module 400 includes a DC conversion unit 402 and a battery 404. The DC conversion unit 402 is connected to the bridge arm assembly 10 and the capacitor assembly 12 in parallel, and the battery 404 is coupled to the DC conversion unit 402. The DC conversion unit 402 is used to regulate the bus voltage Vbus across the capacitor assembly 12 so as to maintain the bus voltage Vbus within a predetermined range. The control unit 14 detects the bus voltage Vbus across the capacitor assembly 12. When the bus voltage Vbus is greater than a first threshold voltage, it means the energy converted by the bridge arm assembly 10 is excess, and therefore the control unit 14 controls the DC conversion unit 402 to convert the bus voltage Vbus into a DC voltage Vd so that the excess energy charges the battery 404. When the bus voltage Vbus is less than a second threshold voltage, it means that the energy stored in the capacitor assembly 12 cannot supply the loads 300-1 to 300-3, and therefore the control unit 14 controls the DC conversion unit 402 to convert the DC voltage Vd into the bus voltage to charge the capacitor assembly 12.

The power conversion apparatus 100 further includes a first filtering circuit 22 and a second filtering circuit 24. The first filtering circuit 22 is coupled between the first load end A and the middle end C, and the second filtering circuit 24 is coupled between the second load end B and the middle end C. Each of the first filtering circuit 22 and the second filtering circuit 24 includes a filtering inductor L and a filtering capacitor Cf, and the first filtering circuit 22 and the second filtering circuit 24 are used to filter a PWM sine-wave voltage to a sine-wave voltage. Specifically, since the voltage switched by the bridge arm assembly 10 is a PWM sine-wave voltage, the first filtering circuit 22 and the second filtering circuit 24 have to filter the PWM sine-wave voltage to the sine-wave voltage in order to provide better AC output power.

The power conversion apparatus 100 includes two current sensing units 32-1,32-2 and two voltage detecting units 34-1,34-2. The current sensing units 32-1,32-2 are respectively coupled to the first load end A and the second load end B for respectively sensing a first load current I1 flowing through the first load end A and a second load current I2 flowing through the second load end B. The voltage detecting unit 34-1 is coupled between the first load end A and the middle end C for detecting a first load voltage V1 between the first load end A and the middle end C. The voltage detecting unit 34-2 is coupled between the second load end B and the middle end C for detecting a second load voltage V2 between the second load end B and the middle end C. Further, a third load voltage V3 between the first load end A and the second load end B can be detected by the voltage detecting units 34-1,34-2. The control unit 14 is coupled to the current sensing units 32-1,32-2 and the voltage detecting units 34-1,34-2, and acquires the load currents I1,I2 and the load voltages V1,V2,V3 according to detection signals provided by the current sensing units 32-1,32-2 and the voltage detecting units 34-1,34-2.

Figure 2A:
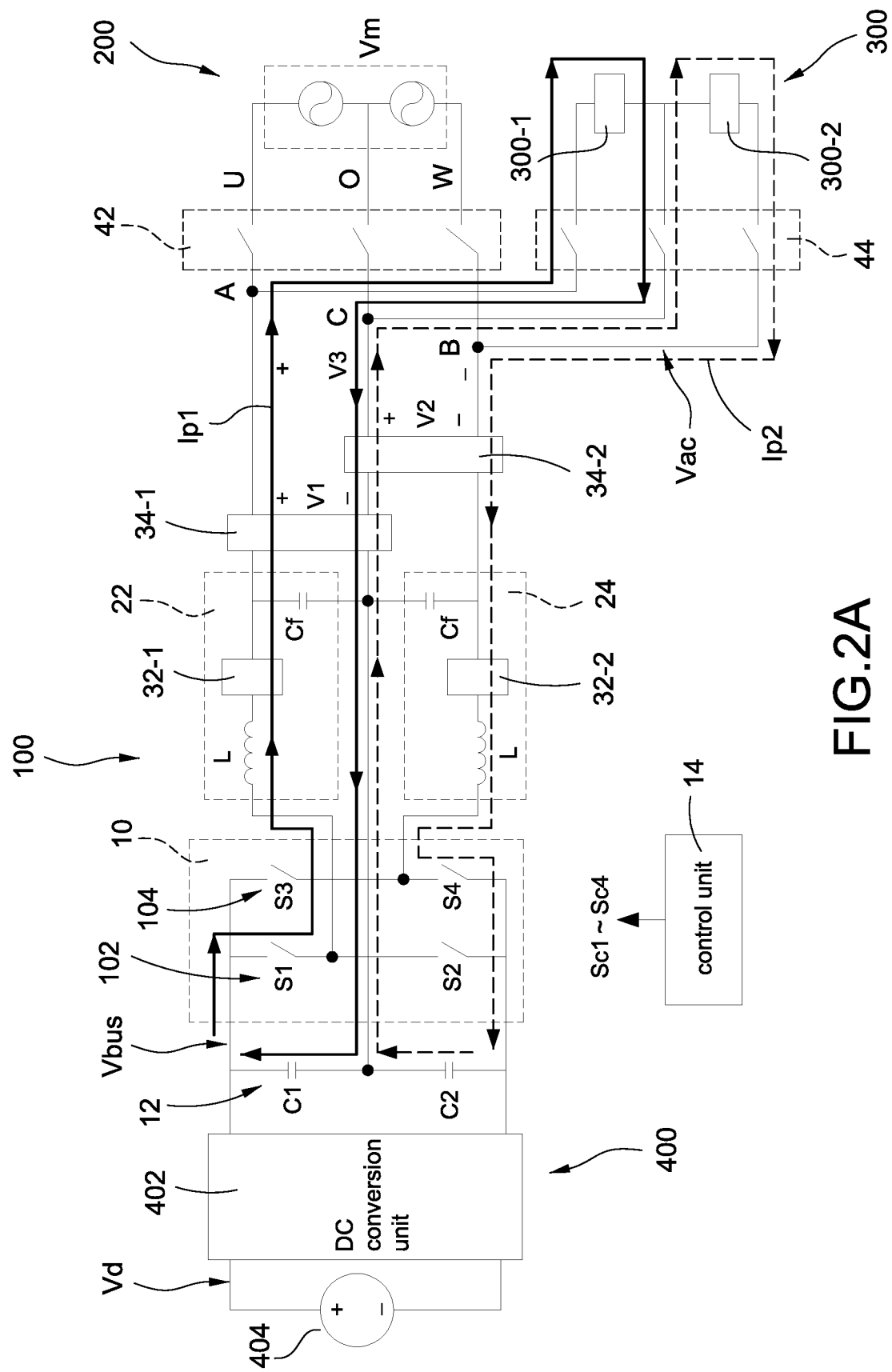
FIG. 2A is a block circuit diagram of the power conversion apparatus with dual-mode control operating in a positive half cycle according to the present disclosure.
Figure 2B:
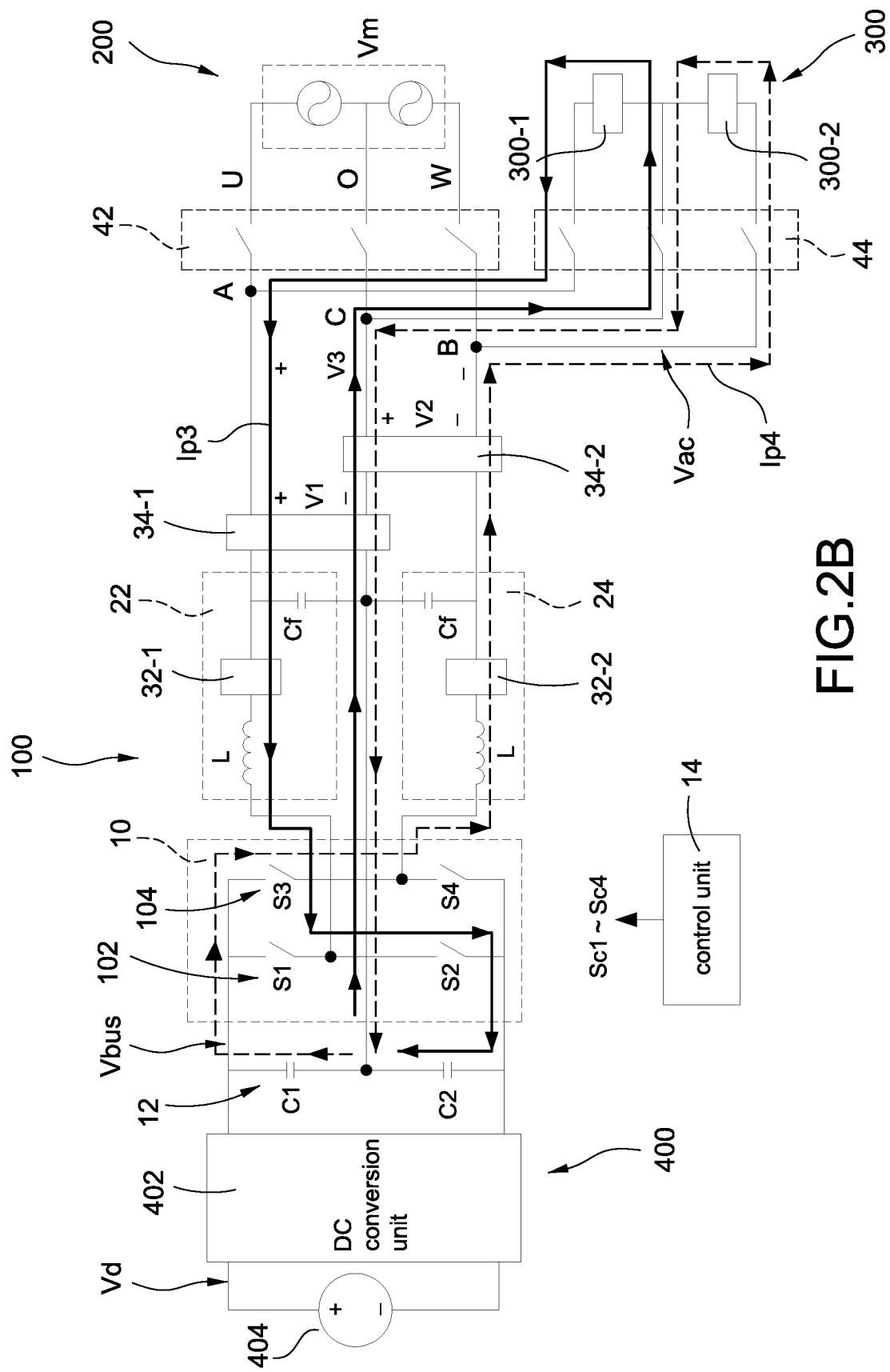
FIG. 2B is a block circuit diagram of the power conversion apparatus with dual-mode control operating in a negative half cycle according to the present disclosure.

Please refer to FIG. 2A and FIG. 2B, which show block circuit diagrams of the power conversion apparatus with dual-mode control operating in a positive half cycle and a negative half cycle according to the present disclosure, respectively, and also refer to FIG. 1. In FIG. 2A and FIG. 2B, a first load 300-1 and a second load 300-2 are exemplified. In this embodiment, the first load 300-1 is a power-receiving household load, and the second load 300-2 is a power-supplying PV (photovoltaic) inverter. The control unit 14 controls the first bridge arm 102 to operate in the voltage source switching mode in response to the power-receiving household load (i.e., the first load 300-1), and controls the second bridge arm 104 to operate in the current source switching mode in response to the power-supplying PV inverter (i.e., the second load 300-2). When the first bridge arm 102 operates in the voltage source switching mode, the control unit 14 detects the first load voltage V1 by the voltage detecting unit 34-1. According to the first load voltage V1, the control unit 14 performs a feedback control to stabilize the first load voltage V1 to be the predetermined AC voltage output by adjusting the duty cycle of the control signals Sc1-Sc2. When the second bridge arm 104 operates in the current source switching mode, the control unit 14 senses the second load current I2 by the current sensing unit 32-2, and realizes the second load voltage V2 through the detection of the voltage detecting unit 34-2. Afterward, the control unit 14 acquires a second load power through the product of the second load current I2 and the second load voltage V2, and adjusts the second load power drawn from the PV inverter according to the second load power.

The determination of the load which is a power-supplying load or a power-receiving load, in addition to being predetermined by the user in the control unit 14 through the communication interface, the present disclosure also proposes another determination manner. Since the power-supplying load can output voltage but the power-receiving load cannot, it can be determined that the loads 300-1,300-2 are power-supplying loads or power-receiving loads based on this characteristic. That is, when the first load 300-1 (household load) is coupled to the power conversion apparatus 100, no voltage outputted from the first load 300-1 since the first load 300-1 is a power-receiving load. Therefore, before the first bridge arm 102 and the second bridge arm 104 are controlled by the control unit 14, the voltage detecting unit 34-1 does not detect the first load voltage V1, and therefore the first load 300-1 is determined to be a power-receiving load and the first bridge arm 102 is operated in the voltage source switching mode. When the second load 300-2 (PV inverter) is coupled to the power conversion apparatus 100, there is voltage outputted from the second load 300-2 since the second load 300-2 is a power-supplying load. Therefore, the voltage detecting unit 34-2 detects the second load voltage V2, and therefore the second load 300-2 is determined to be a power-supplying load and the second bridge arm 104 is operated in the current source switching mode.

As shown in FIG. 2A, the first upper bridge switch S1 and the first lower bridge switch S2 of the first bridge arm 102 are alternately switched so that the power conversion apparatus 100 provides an AC voltage source to the first load 300-1. Take the first upper bridge switch S1 which is turned on in the positive half cycle as an example. When the first capacitor C1 supplies power to the first load 300-1, a first current path Ip1 is generated (formed) through the first capacitor C1, the first upper bridge switch S1, the first load end A, the first load 300-1, and the middle end C. On the other hand, by alternately switching the second upper bridge switch S3 and the second lower bridge switch S4 of the second bridge arm 104, the power supplied to the second load 300-2 is controlled. Take the second lower bridge switch S4 which is turned on as an example. A second current path Ip2 is generated (formed) through the second load 300-2, the second load end B, the second lower bridge switch S4, the second capacitor C2, and the middle end C. As shown in FIG. 2B, take the first lower bridge switch S2 which is turned on in the negative half cycle as an example. When the second capacitor C2 supplies power to the first load 300-1, a third current path Ip3 is generated (formed) through the second capacitor C2, the middle end C, the first load 300-1, the first load end A, and the first lower bridge switch S2. On the other end, take the second upper bridge switch S3 which is turned on as an example. A fourth current path Ip4 is generated (formed) through the second load 300-2, the middle end C, the first capacitor C1, the second upper bridge switch S3, and the second load end B. As shown in FIG. 2A and FIG. 2B, when the first bridge arm 102 and the second bridge arm 104 are switched, if the direction of currents flowing through the middle end C is opposite, the currents can cancel each other. Further, the currents can be controlled to flow in the same direction, but the current will be relatively large. If the second load 300-2 is the power-supplying load, since the second load 300-2 has a specific AC voltage output, and the voltage of the first load 300-1 is generated by controlling the switching of the first bridge arm 102 by the control unit 14, preferably, the control unit 14 can determine the voltage phase of the first load 300-1 according to the voltage phase of the second load 300-2 so that the current flowing through the midpoint end C can be cancelled to reduce the current.

Figure 2C:
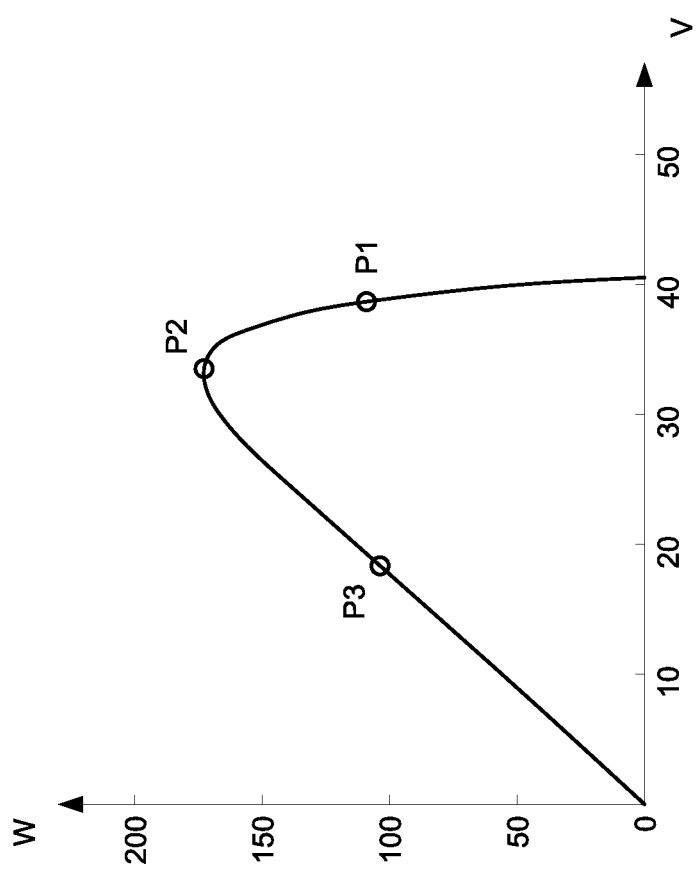
FIG. 2C is a curve of a power characteristic curve of a photovoltaic panel.

Please refer to FIG. 2C, which shows a curve of a power characteristic curve of a photovoltaic panel, and also refer to FIG. 1 to FIG. 2B. In the conditions of short-circuit current (the leftmost point of the power characteristic curve) and open-circuit voltage (the rightmost point of the power characteristic curve) of the PV panel, the output power is zero. Further, in a maximum power point P2, the output power is maximal. Therefore, the control unit 14 controls the second load power drawn from the second load 300-2 to be the maximal power by adjusting the duty cycle of the control signals Sc3-Sc4, thereby increasing the efficiency of the PV inverter. However, this kind of control manner will cause the problem of power imbalance.

Specifically, when the second load power drawn from the second load 300-2 is adjusted to the maximal power, the power provided by the second load 300-2 may be different from the power received by the first load 300-1. When the power provided by the second load 300-2 is larger, the bus voltage Vbus across the capacitor assembly 12 is greater than the first threshold voltage, and therefore the DC conversion unit 402 will convert the bus voltage Vbus into the DC voltage Vd and excess energy is stored in the battery 404. On the contrary, when the power provided by the second load 300-2 is less, the bus voltage Vbus across the capacitor assembly 12 is less than the second threshold voltage, and therefore the DC conversion unit 402 will convert the DC voltage Vd into the bus voltage Vbus and the energy stored in the battery 404 is supplemented to the bus voltage Vbus. Accordingly, the DC conversion module 400 and the second load 300-2 commonly supply power to the first load 300-1.

For example, refer to the power characteristic curve of the photovoltaic panel shown in FIG. 2C. It is assumed that the required power of the first load 300-1 is 2 kW and the maximum power at the maximum power point P2 is 10 kW. Since the required power of the first load 300-1 is 2 kW, the power point of providing 2 kW from the second load 300-2 is on P1. In order to acquire the maximal power, however, the control unit 14 adjusts the duty cycle of the control signals Sc3-Sc4 to draw power of 10 kW from the second load 300-2. Due to the extra power of 8 kW, the control unit 14 controls the DC conversion unit 402 to convert the bus voltage Vbus into the DC voltage Vd to store the excess energy in the battery 404. In particular, the detection of the maximum power point P2 is that the control unit 14 adjusts the duty cycle of the control signals Sc3-Sc4, and senses the second load current I2 by the current sensing unit 32-2 and detects the second load voltage V2 by the voltage detecting unit 34-2, thereby acquiring the maximal power. When the duty cycle of the control signals Sc3-Sc4 is controlled by the control unit 14 and the power is gradually declined from P2 to P3, it represents that P2 is the maximum power point.

Figure 3:
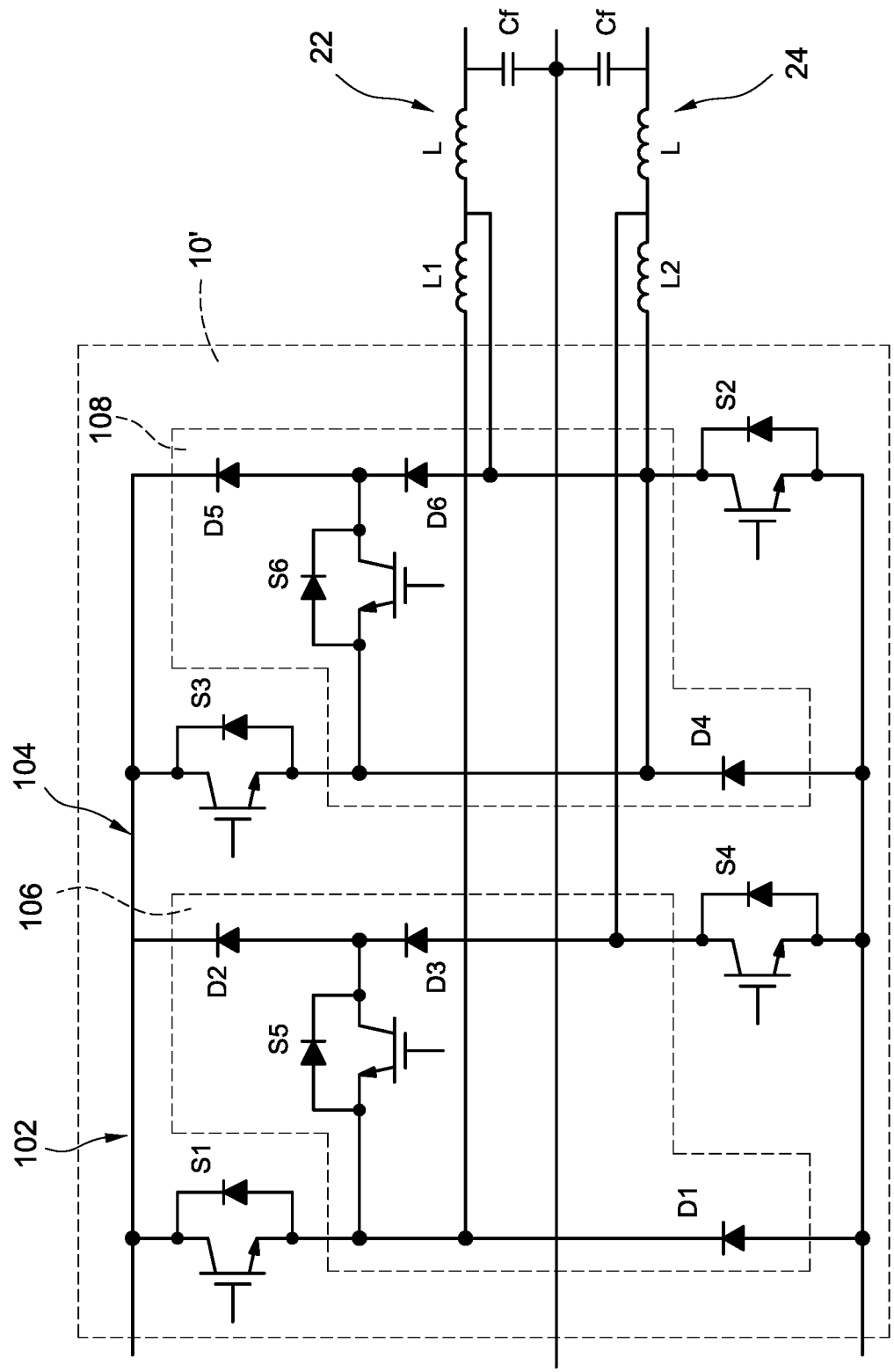
FIG. 3 is a circuit diagram of a bridge arm assembly of another embodiment according to the present disclosure.

Please refer to FIG. 3, which shows a circuit diagram of a bridge arm assembly of another embodiment according to the present disclosure, and also refer to FIG. 2 to FIG. 2C. In FIG. 1, the bridge arm assembly 10 is composed of two switch bridge arms. The embodiment shown in FIG. 3 is a dual step-down converter, which can be controlled by the dual half-bridge control manner. The bridge arm assembly 10' includes a first auxiliary circuit 106 and a second auxiliary circuit 108. The first auxiliary circuit 106 is coupled to the first upper bridge switch S1 and the second lower bridge switch S4, and coupled to the first lower bridge switch S2 through a first auxiliary inductor L1. The second auxiliary circuit 108 is coupled to the second upper bridge switch S3 and the first lower bridge switch S2, and coupled to the second lower bridge switch S4 through a second auxiliary inductor L2.

The first auxiliary circuit 106 includes a first auxiliary switch S5, a first diode D1, a second diode D2, and a third diode D3. The second auxiliary circuit 108 includes a second auxiliary switch S6, a fourth diode D4, a fifth diode D5, and a sixth diode D6. A first end of the first auxiliary switch S5 is coupled to a second end of the first upper bridge switch S1, a cathode of the first diode D1 is coupled to the second end of the first upper bridge switch S1 and a first end of the first auxiliary inductor L1, and an anode of the first diode D1 is coupled to a second end of the second lower bridge switch S4. A cathode of the second diode D2 is coupled to a first end of the first upper bridge switch S1, and an anode of the second diode D2 is coupled to a second end of the first auxiliary switch S5. A cathode of the third diode D3 is coupled to the second end of the first auxiliary switch S5, and an anode of the third diode D3 is coupled to a first end of the second lower bridge switch S4 and a second end of the second auxiliary inductor L2. A first end of the second auxiliary switch S6 is coupled to a second end of the second upper bridge switch S3, a cathode of the fourth diode D4 is coupled to the second end of the second upper bridge switch S3 and a first end of the second auxiliary inductor L2, and an anode of the fourth diode D4 is coupled to a second end of the first lower bridge switch S2. A cathode of the fifth diode D5 is coupled to a first end of the second upper bridge switch S3, and an anode of the fifth diode D5 is coupled to a second end of the second auxiliary switch S6. A cathode of the sixth diode D6 is coupled to the second end of the second auxiliary switch S6, and an anode of the sixth diode D6 is coupled to a first end of the first lower bridge switch S2 and a second end of the first auxiliary inductor L1.

Since the inductance values of the first auxiliary inductor L1 and the second auxiliary inductor L2 are small, and can also be directly short-circuited in some embodiments, the control unit 14 can perform a similar half-bridge operation for the bridge arm assembly 10', that is, the first bridge arm 102 is composed of the first upper bridge switch S1 and the first lower bridge switch S2, and the second bridge arm 104 is composed of the second upper bridge switch S3 and the second lower bridge switch S4. The first auxiliary circuit 106 and the second auxiliary circuit 108 provide a freewheeling path between the first bridge arm 102 and the second bridge arm 104, thereby reducing current ripple and eliminating leakage current and common mode noise. The circuit structure and the operation of the power conversion apparatus 100 can further save the power consumption of the capacitor assembly 12 and increase the overall circuit efficiency of the power conversion apparatus 100.

Figure 4A:
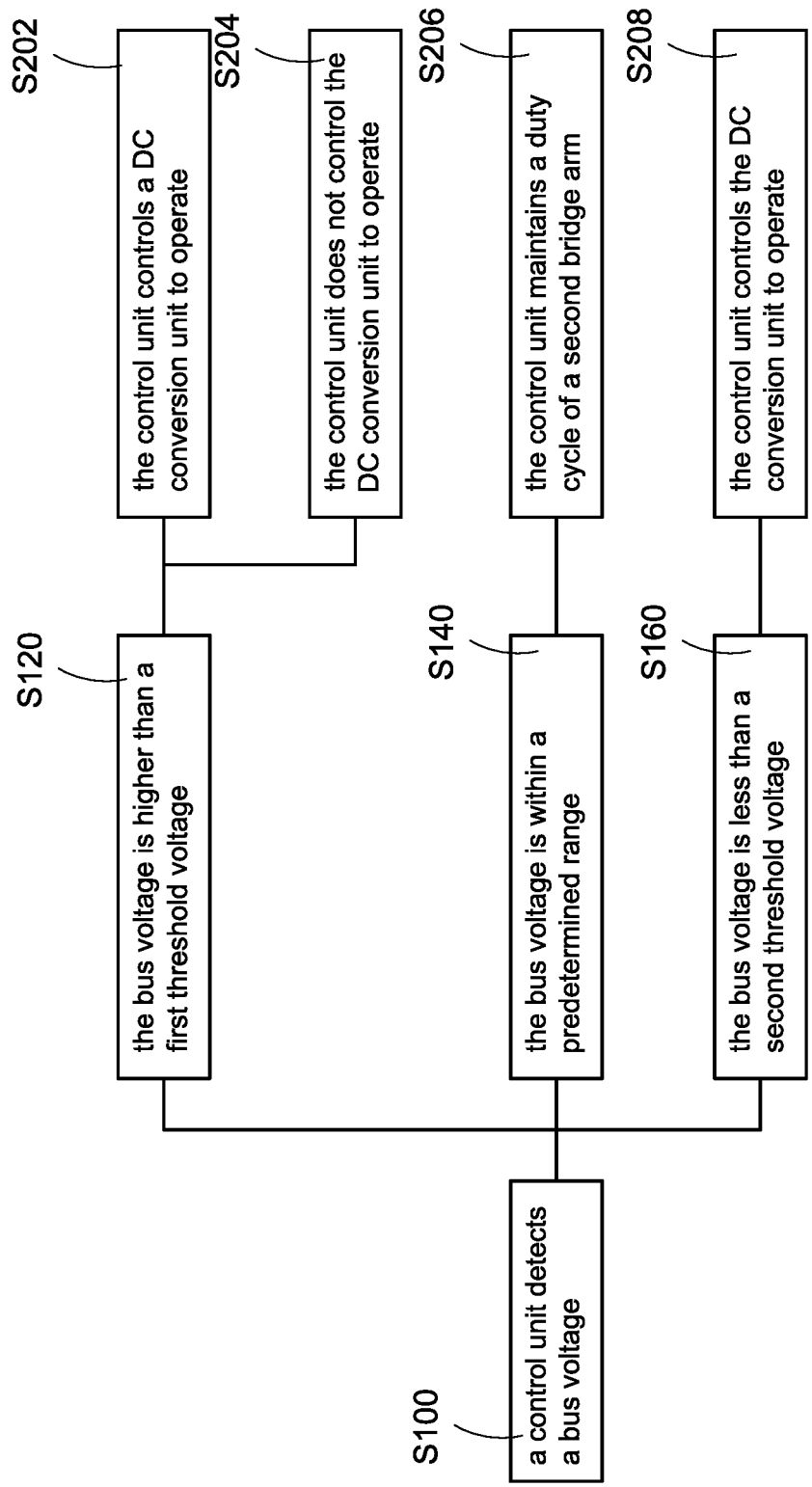
FIG. 4A is a flowchart that one half bridge operates in a current source switching mode and the other half bridge operates in a voltage source switching mode according to the present disclosure.
Figure 4B:
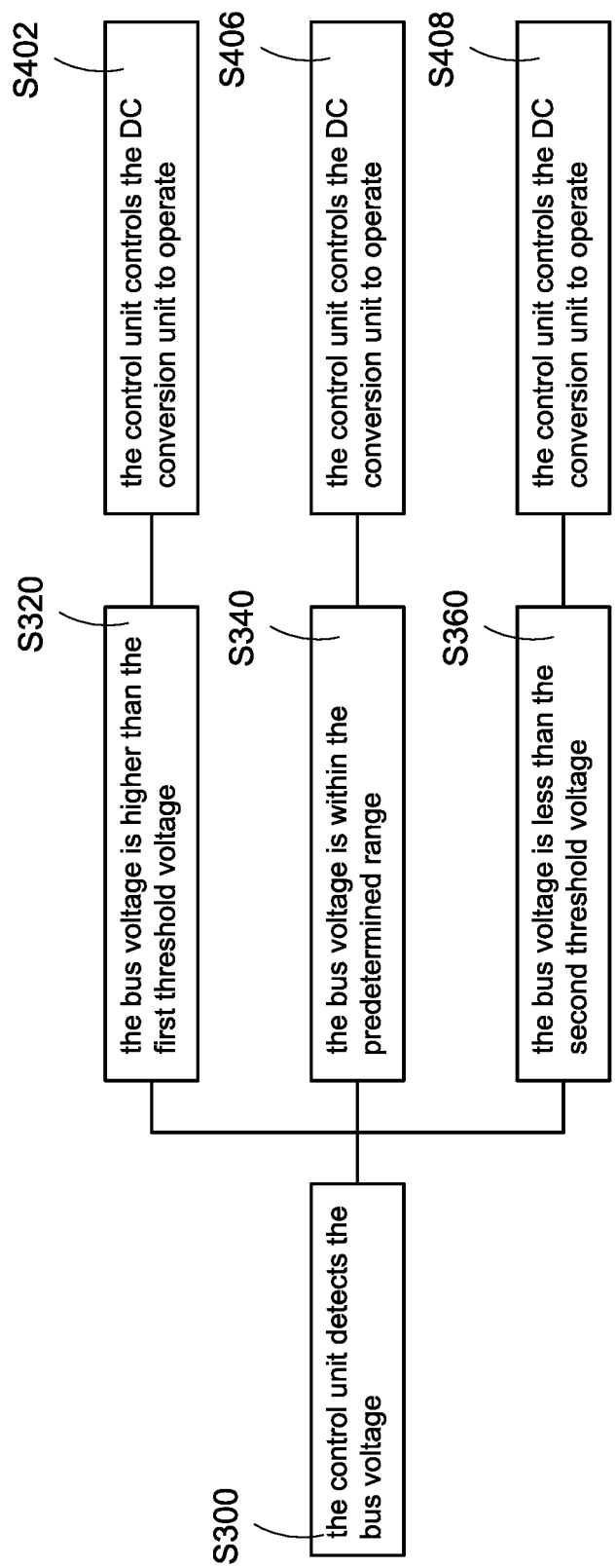
FIG. 4B is a flowchart that two half bridges operate in the voltage source switching mode and a PV inverter supplies power to an external load according to the present disclosure.

Please refer to FIG. 4A, which shows a flowchart that one half bridge operates in a current source switching mode and the other half bridge operates in a voltage source switching mode according to the present disclosure, and please refer to FIG. 4B, which shows a flowchart that two half bridges operate in the voltage source switching mode and a PV inverter supplies power to an external load according to the present disclosure, and also refer to FIG. 1 to FIG. 3. In FIG. 4A, it is assumed that the first load 300-1 is a household load and the second load 300-2 is a PV inverter. The control unit 14 controls the first bridge arm 102 operating in the voltage source switching mode and the second bridge arm 104 operating in the current source switching mode. At this condition, the control unit 14 detects the bus voltage Vbus (S100). When the control unit 14 realizes that the bus voltage Vbus is higher than the first threshold voltage (S120), two control manners can be performed. The first one is, the control unit 14 controls the DC conversion unit 402 to operate (S202) to convert the bus voltage Vbus into the DC voltage Vd to store the excess energy in the battery 404 (to charge the battery 404). The second one is, the control unit 14 does not control the DC conversion unit 402 to operate (S204) but adjusts the duty cycle of the bridge arm (the second bridge arm 104) operating in the current source switching mode to stabilize the bus voltage Vbus within the predetermined range. When the control unit realizes that the bus voltage Vbus is within the predetermined range (S140), it represents that the power acquired from the second load 300-2 (the PV inverter) is approximately equal to the power consumed by the first load 300-1 (the household load), and therefore the control unit 14 maintains the duty cycle of the second bridge arm 104 (S206). At this condition, the DC conversion unit 402 can operate or not operate, and the main reason of operation is to maintain the bus voltage Vbus stably within the predetermined range. For example, the control unit 14 can control the DC conversion unit 402 operating in a hiccup mode to maintain the stability of the bus voltage Vbus. When the control unit 14 realizes that the bus voltage Vbus is less than the second threshold voltage (S160), the control unit 14 controls the DC conversion unit 402 to operate (S208) to convert the DC voltage Vd into the bus voltage Vbus so that the battery 404 and the second load 300-2 (the PV inverter) commonly supply power to the first load 300-1.

In FIG. 4B, when one PV inverter is connected to the first load end A and the second load end B (not shown in FIG. 1) to connect to the third load 300-3 in parallel, the PV inverter is an external power source to supply power to the loads 300-1,300-2,300-3. In such structure, the control unit 14 detects the bus voltage Vbus (S300). When the control unit 14 realizes that the bus voltage Vbus is greater than a first threshold voltage (S320), it represents that the external PV inverter has high energy, and therefore the control unit 14 controls the DC conversion unit 402 to operate (S402) to convert the bus voltage Vbus into the DC voltage Vd. When the control unit realizes that the bus voltage Vbus is within a predetermined range (S340), the external PV inverter supplies power to the loads 300-1,300-2,300-3. At this condition, the control unit 14 controls the DC conversion unit 402 to operate (S406) to maintain the bus voltage Vbus within the predetermined range. When the control unit 14 realizes that the bus voltage Vbus is less than a second threshold voltage (S360), the control unit 14 controls the DC conversion unit 402 to operate (S408) to convert the DC voltage Vd into the bus voltage Vbus so that the battery 404 and the PV inverter jointly supply power to the loads 300-1,300-2,300-3.

Figure 5A:
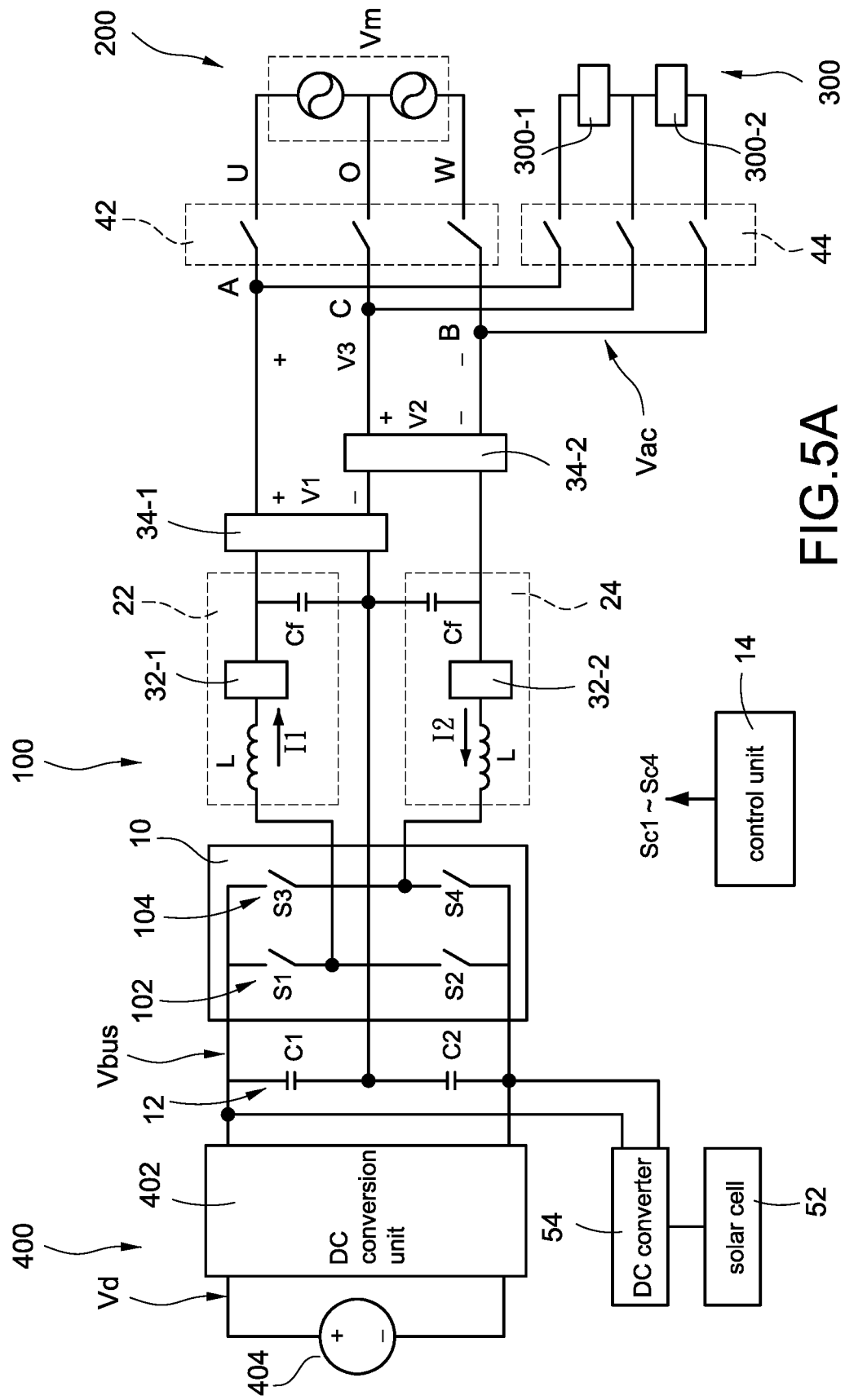
FIG. 5A is a block circuit diagram of the power conversion apparatus with dual-mode control according to a first derivative embodiment of the present disclosure.
Figure 5B:
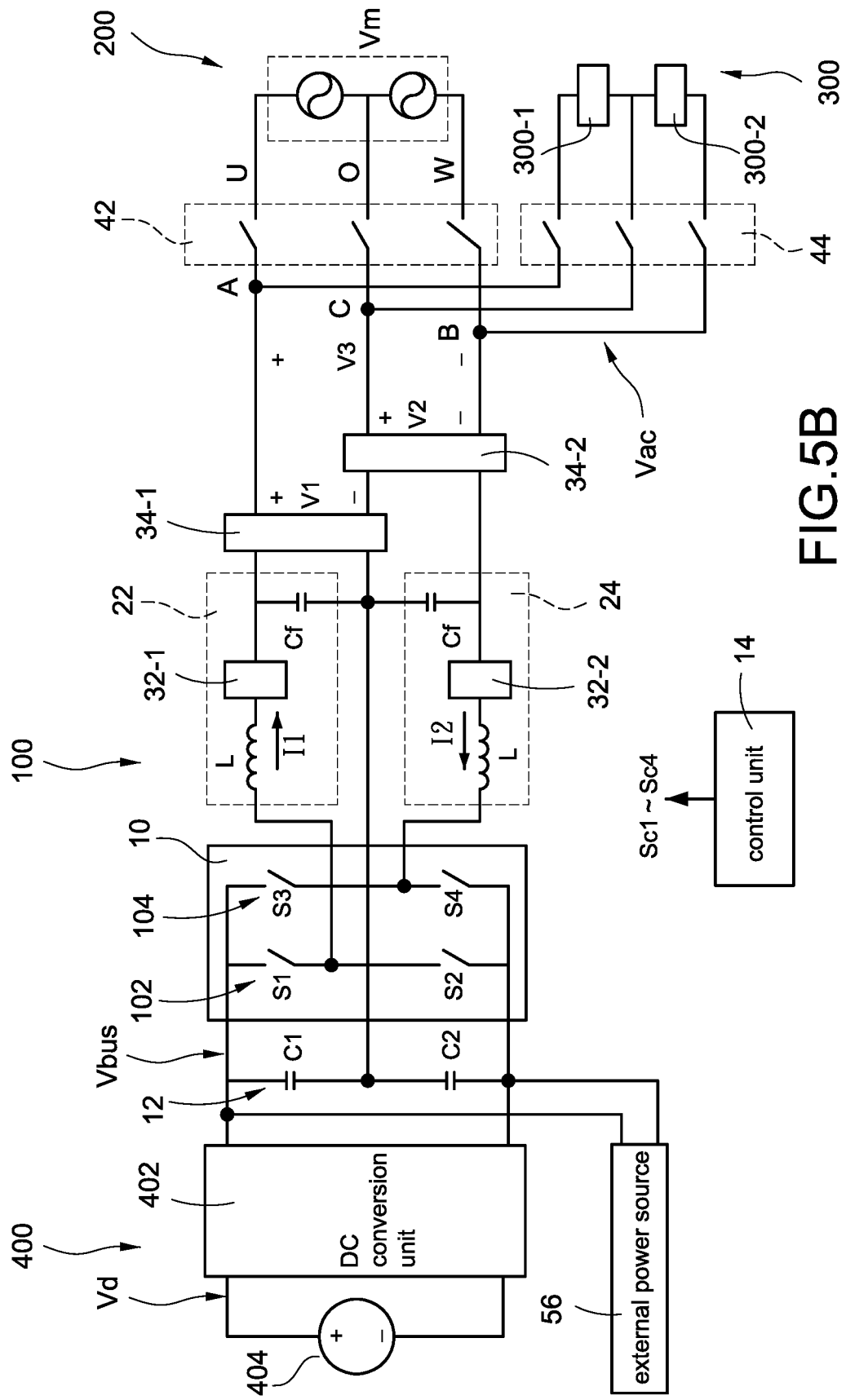
FIG. 5B is a block circuit diagram of the power conversion apparatus with dual-mode control according to a second derivative embodiment of the present disclosure.

Please refer to FIG. 5A and FIG. 5B, which show block circuit diagrams of the power conversion apparatus with dual-mode control according to a first derivative embodiment and a second derivative embodiment of the present disclosure, respectively, and also refer to FIG. 1 to FIG. 4B. As shown in FIG. 5A, a solar cell 52 can be used to couple to two ends of the capacitor assembly 12 through a DC converter 54. Therefore, the energy provided by the solar cell 52 is converted into the bus voltage Vbus to supplement the power consumed by capacitor assembly 12 during operation. The power conversion apparatus 100, the solar cell 52, and the DC converter 54 form a PV inverter to supply power to the power grid 200 and the load assembly 300, and the load assembly 300 allows to be connected to both the power-receiving household load and another PV inverter, which can not only maintain normal operation but also utilize the power of the PV inverter at the load side. As shown in FIG. 5B, the solar cell 52 and the DC converter 54 can be replaced by an external power source 56, that is, the external power source 56 can continuously supplement the power consumed by capacitor assembly 12 during operation so as to maintain the bus voltage Vbus within the predetermined range.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:
1. A power conversion apparatus with dual-mode control, comprising:
 a bridge arm assembly, comprising:
  a first bridge arm having a first upper bridge switch and a first lower bridge switch; a node between the first upper bridge switch and the first lower bridge switch coupled to a first load end, and
  a second bridge arm having a second upper bridge switch and a second lower bridge switch, and connected to the first bridge arm in parallel, and a node between the second upper bridge switch and the second lower bridge switch coupled to a second load end,
 a capacitor assembly having a first capacitor and a second capacitor connected in series, and connected to the second bridge arm in parallel, and a node between the first capacitor and the second capacitor coupled to a middle end, and
 a control unit configured to selectively control the first bridge arm to be operated in a voltage source switching mode or a current source switching mode according to the load type of a first load coupled to the first load end and the middle end, and to selectively control the second bridge arm to be operated in the voltage source switching mode or the current source switching mode according to the load type of a second load coupled to the second load end and the middle end.

2. The power conversion apparatus in claim 1, wherein when the first bridge arm operates in the voltage source switching mode, the control unit is configured to adjust a first duty cycle of switching the first bridge arm according to a first load voltage at the first load end and the middle end so as to stabilize the first load voltage; when the first bridge arm operates in the current source switching mode, the control unit is configured to acquire a first load power according to the product of a first load current flowing through the first load end and the first load voltage, and adjust the first duty cycle according to the first load power.

3. The power conversion apparatus in claim 2, wherein the control unit determines that the first load is a power-receiving load and controls the first bridge arm to be operated in the voltage source switching mode when the first load voltage is not detected by a voltage detecting unit; the control unit determines that the first load is a power-supplying load and controls the first bridge arm to be operated in the current source switching mode when the first load voltage is detected by the voltage detecting unit.

4. The power conversion apparatus in claim 2, wherein when the first bridge arm operates in the current source switching mode, the control unit is configured to adjust the first load power to a maximum load power by adjusting the first duty cycle.

5. The power conversion apparatus in claim 2, further comprising:
   a first filtering circuit coupled to the first bridge arm, the first load end, and the middle end, and
   a second filtering circuit coupled to the second bridge arm, the second load end, and the middle end.

6. The power conversion apparatus in claim 1, wherein when the second bridge arm operates in the voltage source switching mode, the control unit is configured to adjust a second duty cycle of switching the second bridge arm according to a second load voltage at the second load end and the middle end so as to stabilize the second load voltage; when the second bridge arm operates in the current source switching mode, the control unit is configured to acquire a second load power according to the product of a second load current flowing through the second load end and the second load voltage, and adjust the second duty cycle according to the second load power.

7. The power conversion apparatus in claim 6, wherein the control unit determines that the second load is a power-receiving load and controls the second bridge arm to be operated in the voltage source switching mode when the second load voltage is not detected by a voltage detecting unit; the control unit determines that the second load is a power-supplying load and controls the second bridge arm to be operated in the current source switching mode when the second load voltage is detected by the voltage detecting unit.

8. The power conversion apparatus in claim 6, wherein when the second bridge arm operates in the current source switching mode, the control unit is configured to adjust the second load power to a maximum load power by adjusting the second duty cycle.

9. The power conversion apparatus in claim 1, further comprising:
   a DC conversion unit connected to the bridge arm assembly in parallel, and
   a battery coupled to the DC conversion unit,
   wherein the control unit is configured to detect a bus voltage of the capacitor assembly; when the bus voltage is greater than a first threshold voltage, the control unit is configured to control the DC conversion unit to convert the bus voltage into a DC voltage for charging the battery; when the bus voltage is less than a second threshold voltage, the control unit is configured to control the DC conversion unit to convert the DC voltage into the bus voltage for charging the capacitor assembly.

10. The power conversion apparatus in claim 1, wherein the first bridge arm is controlled by the control unit to be operated in the voltage source switching mode so that the capacitor assembly supplies power to the first load by switching the first bridge arm; the second bridge arm is controlled by the control unit to be operated in the current source switching mode so that the second load charges the capacitor assembly by switching the second bridge arm.

11. The power conversion apparatus in claim 10, wherein the control unit is configured to determine a second voltage phase outputted to the first load according to a first voltage phase of the second load.

12. The power conversion apparatus in claim 1, further comprising:

a first relay module, one end of the first relay module coupled to the first load end, the second load end, and the middle end, and the other end of the first relay module coupled to a power grid, and
a second relay module, one end of the second relay module coupled to the first load end, the second load end, and the middle end, and the other end of the second relay module coupled to the first load and the second load,
wherein the first relay module and the second relay module are controlled to determine whether the first load and the second load are in a grid-connected operation.

13. The power conversion apparatus in claim 1, wherein the first upper bridge switch is connected to the first lower bridge switch in series, and the second upper bridge switch is connected to the second lower bridge switch in series.

14. The power conversion apparatus in claim 1, wherein the bridge arm assembly further comprises:
   a first auxiliary circuit coupled to the first upper bridge switch and the second lower bridge switch, and coupled to the first lower bridge switch through a first auxiliary inductor, and
   a second auxiliary circuit coupled to the second upper bridge switch and the first lower bridge switch, and coupled to the second lower bridge switch through a second auxiliary inductor.

15. The power conversion apparatus in claim 14, wherein the first auxiliary comprises:
   a first auxiliary switch, a first end of the first auxiliary switch coupled to a second end of the first upper bridge switch,
   a first diode, a cathode of the first diode coupled to the second end of the first upper bridge switch and a first end of the first auxiliary inductor, and an anode of the first diode coupled to a second end of the second lower bridge switch,
   a second diode, a cathode of the second diode coupled to a first end of the first upper bridge switch, and an anode of the second diode coupled to a second end of the first auxiliary switch, and
   a third diode, a cathode of the third diode coupled to the second end of the first auxiliary switch, and an anode of the third diode coupled to a first end of the second lower bridge switch and a second end of the second auxiliary inductor, and
the second auxiliary comprises:
   a second auxiliary switch, a first end of the second auxiliary switch coupled to a second end of the second upper bridge switch,
   a fourth diode, a cathode of the fourth diode coupled to the second end of the second upper bridge switch and a first end of the second auxiliary inductor, and an anode of the fourth diode coupled a second end of the first lower bridge switch,
   a fifth diode, a cathode of the fifth diode coupled a first end of the second upper bridge switch, and an anode of the fifth diode coupled to a second end of the second auxiliary switch, and
   a sixth diode, a cathode of the sixth diode coupled to the second end of the second auxiliary switch, and an anode of the sixth diode coupled to a first end of the first lower bridge switch and a second end of the first auxiliary inductor.

* * * * *